Figure 1:
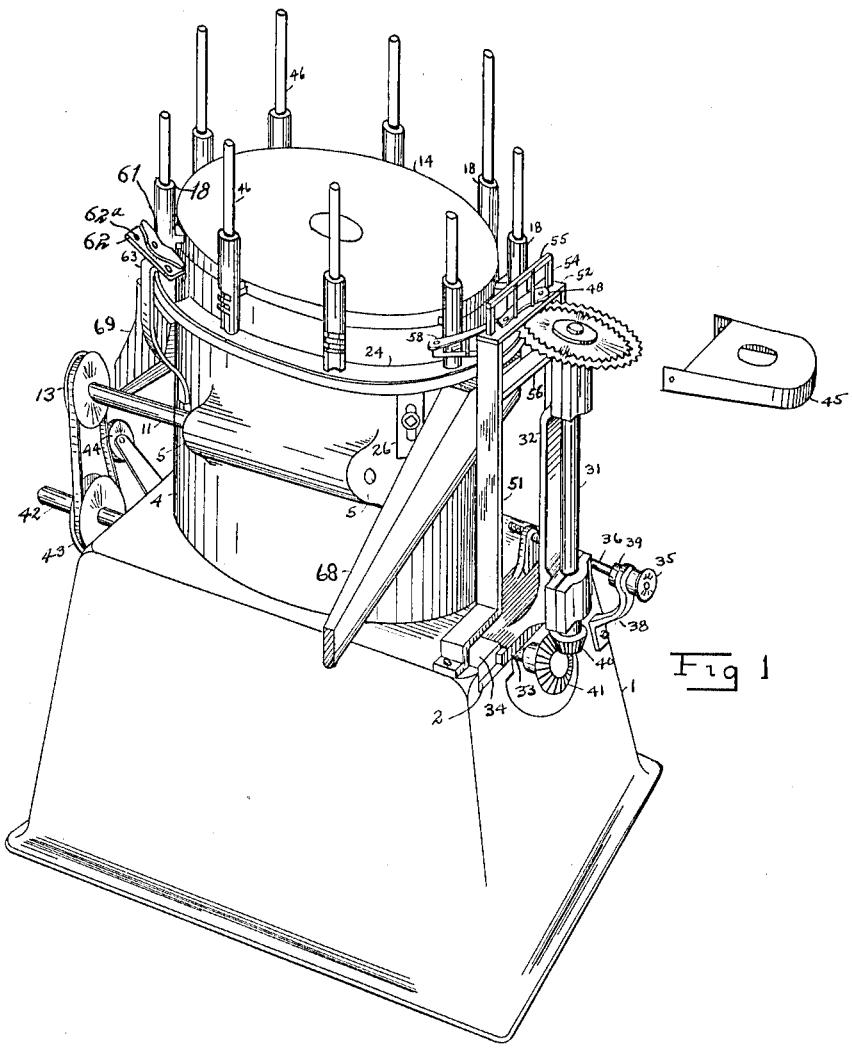

C. G. DAUBER.
DOWEL CUTTING OFF AND POINTING MACHINE.
APPLICATION FILED JAN. 2, 1913.

1,073,846.

Patented Sept. 23, 1913.
3 SHEETS—SHEET 1.

WITNESSES:
J. Farrell
Mary Monahan

INVENTOR
Charles G. Dauber
BY
Louis J. Monahan
ATTORNEY

C. G. DAUBER.
DOWEL CUTTING OFF AND POINTING MACHINE.
APPLICATION FILED JAN. 2, 1913.
1,073,846.
Patented Sept. 23, 1913.
3 SHEETS—SHEET 2.
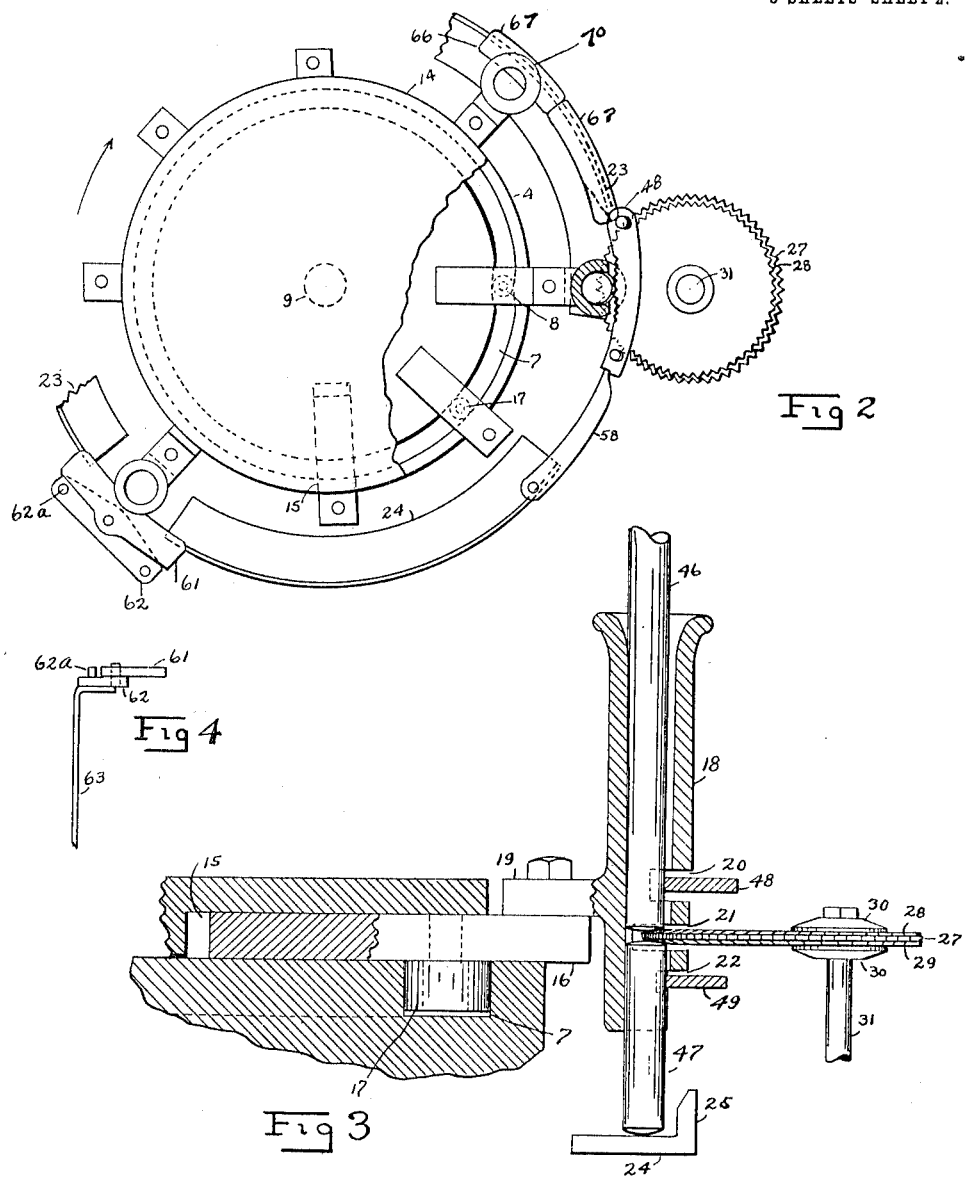
WITNESSES:
J. Farrell
Mary Monahan
INVENTOR
Charles G Dauber
BY
Louis J Monahan
ATTORNEY C. G. DAUBER.
DOWEL CUTTING OFF AND POINTING MACHINE.
APPLICATION FILED JAN. 2, 1913.
1,073,846.
Patented Sept. 23, 1913.
3 SHEETS—SHEET 3.
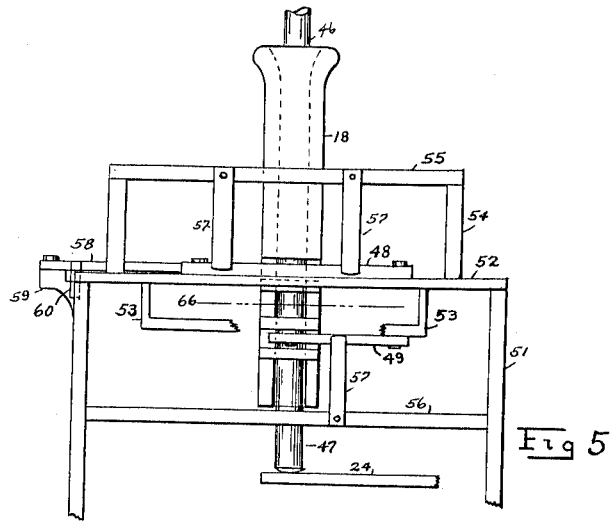
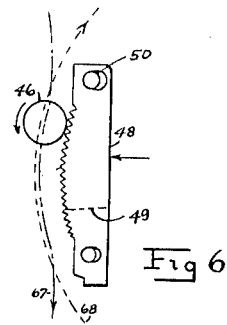
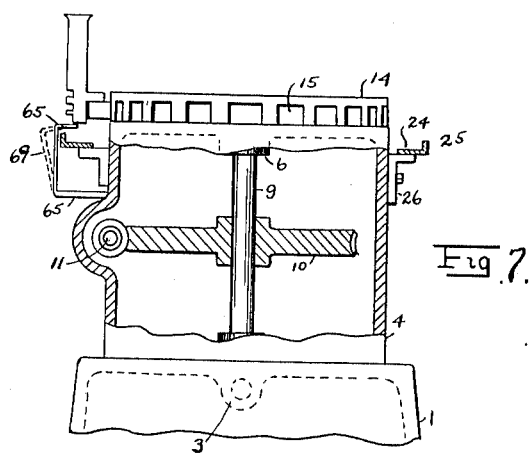
WITNESSES:
J. Farrell
Mary Monahan
INVENTOR
Charles G. Dauber
BY
Louis J. Monahan
ATTORNEY

UNITED STATES PATENT OFFICE.

CHARLES G. DAUBER, OF OSHKOSH, WISCONSIN, ASSIGNOR TO EDWIN J. BELL, OF OSHKOSH, WISCONSIN.

DOWEL CUTTING-OFF AND POINTING MACHINE.

1,073,846.

Specification of Letters Patent.   Patented Sept. 23, 1913.

Application filed January 2, 1913. Serial No. 739,645.

*To all whom it may concern:*

Be it known that I, CHARLES G. DAUBER, a citizen of the United States, residing at Oshkosh, in the county of Winnebago and State of Wisconsin, have invented certain new and useful Improvements in Dowel Cutting-Off and Pointing Machines, of which the following is a specification.

The invention relates to a new and useful improvement in dowel cutting off and pointing machines.

The object of the invention is to provide combined mechanism for automatically cutting off dowel pins and simultaneously pointing them on each end ready for use.

In the drawings Figure 1 shows a perspective view of the complete machine; Fig. 2 a plan view of the turret and sawing mechanism; Fig. 3 a sectional view of the dowel rod carrier and saw; Fig. 4 a detail of spring clamping dog; Fig. 5 an elevation of the dowel rod carrier and dowel rotating dogs; Fig. 6 a plan view of the dowel rotating dog and Fig. 7 a section of frame showing turret driving mechanism.

The machine is built in a most compact form and consists of a sub-base 1 having a slide-way 2 on its top near one side, a suitable shaft bearing 3 is formed in the base near one end. Mounted on the sub-base and secured thereto is a circular drum 4 preferably formed of cast iron and has shaft bearings 5 formed therewith. The top of the drum 4 is closed and forms a shaft bearing 6 at the center. A cam groove 7 is formed at the top face of the drum near the periphery thereof, being concentrically disposed therearound excepting a short portion at 8 which is changed to a reverse curve. A driving shaft 9 is journaled in the drum centrally and has a worm gear 10 secured thereon, a shaft 11 is journaled in the bearings 5 and extends back a convenient distance and has a flanged pulley 13 secured thereon. A worm 12 is fitted on the shaft 11 and is adapted to mesh with gear 10. A revoluble turret 14 is secured to the shaft 9 and is fitted to run in close proximity to the upper face of the drum 4, being revolved by shaft 9. The turret has a plurality of slots 15 milled radially in its face, and flat bars 16 are fitted to slide therein. The bars have a roller 17 pivoted thereto and adapted to fit and travel in the cam groove 7, allowance being made for a short portion of the bar 16 to extend beyond the periphery of the turret 14.

Secured to the end of each bar 16 is a dowel carrier 18 having an extending lug 19 forming part thereof, the said lug is bolted or otherwise secured to the extending end of the bars 16. The dowel carrier 18 has a hole through its center a suitable size to permit a dowel rod to easily slip through and has notches 20, 21 and 22 cut in its radially outward side. The upper end of the carrier being chamfered out to allow of an easy entrance of the dowel rods.

A circular rail is fitted around the drum 4 and is composed of segments 23 and 24, the rail having the beveled flange 25 around its outer edge. The rails are secured to the drum 4 by means of adjustable brackets 26 so they can be raised or lowered as required. It will be noted that there is a space between the segmental parts of the track for the passage of dowel pins.

Mechanism for cutting off the dowels and beveling their ends is composed of a set of circular saws, best shown in Fig. 3, wherein a central saw 27 with regular formed teeth, and two saws of smaller diameter 28 and 29 are clamped together by the saw collars 30, the two outside saws have their teeth beveled as shown so they will cut from their beveled portions of the teeth. The saws are driven by a shaft 31 which is journaled in a vertical bracket 32 having a foot 33 formed to fit in the slide-way 2 of the sub-base, blocks 34 are fitted to the sub-base and adapted to hold the foot 33 in sliding position. The saws may be moved toward or away from the machine by means of sliding the foot 33 along the slide-way in the sub-base. For conveniently sliding the saw bracket a hand wheel is provided and has a screw 36 extending therefrom, a threaded lug 37 is secured to the foot 33 or forms part thereof in which the screw 36 is fitted. A bracket 38 is secured to the sub-base and fitted around the screw 36 which has a shoulder or collar 39 so that by turning the wheel 35 the saw bracket will be moved in or out.

The saw is driven by bevel gears 40 and 41, the gear 41 is secured to a shaft 42, the said shaft being journaled in a bearing fitted to the underside of the foot 33 and bearing 3 so that the shaft moves along with the saw bracket. A flanged pulley 43 is secured to the shaft 42, the limited end movement of the shaft 42 being neglected. A belt is fitted to transmit power from the pulley 43 to pulley 13 and has a tightener 44 adapted to be brought up against the belt for starting the operation of the turret 14, the belt being normally loose and therefore acts as a starting and stopping means for this portion of the machine. A guard 45 is fitted over the saw when the machine is in use.

The dowel rod carriers are so arranged that in their travel around with the turret the slot or opening 21 passes through the path of the saws so that the points of the saw teeth extend slightly beyond the center of the dowel carrier. A dowel rod 46 with its lower portion 47 cut off is shown in Fig. 3, the saws having cut and rounded the ends as shown, this result being effected while the carrier is traveling around carrying the dowel rod.

It is necessary to cause the dowel rod to turn or rotate during the cutting action of the saws in order to give the pins rounded points, this is accomplished by means of the upper yielding dog 48 and the lower one 49, these dogs are fitted in line with the slots 20 and 22 so they can rest and press against the dowel rods while same are traveling. The upper dog 48 has teeth formed in its edge and radially with the saw shaft, and is fitted to slide a limited lateral distance in the slots 50.

A framework composed of uprights 51 is provided and mounted on the sub-base 1. A cross piece 52 is secured to the uprights on which is fitted the dog 48. A bracket 53 is attached to the cross piece 52 or forms part thereof, and also forms a support for the lower dog 49. An upper frame comprising standards 54 and cross piece 55 is mounted on the main cross piece 52. Another crossbar 56 is fitted between the standards 51.

For giving the yielding action to the dogs 48 and 49, flat springs 57 are provided and secured to the cross pieces 55 and 56 respectively, in a portion to press against the respective dogs. An auxiliary dog 58 without teeth is pivoted to a bracket 59 which in turn is secured to the framework 51, the dog 58 is also forced inwardly by a flat spring 60, this dog being to hold the dowel rod from dropping through the open space of the segmental tracks 24.

It will be noted that an opening is provided in the tracks 23 and 24 about one third the distance around from the other opening under the saw, this opening being designed to permit short ends of rods to drop out which may be too short to give a proper length of pin. To carry a long, or usable length of rod over this opening another yielding dog is provided which consists of a plate 61 positioned to set in the path of the opening 21 of the carriers. This plate is pivoted to a lower plate 62 so it can swing thereon and has a curved face corresponding to the circular travel of the carriers 18 and has its corners rounded to permit easy entering of the rods. The plate 61 is prevented from turning too far by the pins 62ª in the plate 62. The plate 62 is secured to a spring bracket 63 which in turn is secured to the drum as shown in Fig. 1. The purpose of the rocking movement being to allow the plate to follow up the rod with more equal pressure, and further, in case it is desired to equip the machine with a larger number of carriers 18 the plate 61 will be self adjusting in catching two rods at a time. It will be seen that should a rod which dropped down after being cut be so short as to drop below this opening 21, it would also pass below the plate 61 and drop through this opening in the track and out to the waste chute, but should it be long enough to give another full length pin the plate 61 will prevent it from dropping through the said opening when it will be carried around to make another pin. The spring bracket 63 can be given the desired tension to hold the dowel rod against the side of the carrier and bridge it over the opening.

Before the operation of cutting off and pointing the dowels can commence it is necessary to round off the lower ends of the rods, which is accomplished by devices to prevent the rods from dropping any lower than necessary in the carriers 18 for the first or initial cut, the devices consist of spring tables 69 composed of steel plates with a spring bracket which is secured to the drum or body 4 in a position to allow the ends of the dowel rods to rest thereon slightly below the saw path. The spring bracket permits the tables to be sprung outwardly for allowing rods to be forced by which have already had their initial cut and are traveling around for further severing, to permit the traveling dowel rods to force the tables outward, the corners thereof are rounded as shown at 66. Two or more table devices can be used to give flexibility. It is obviously necessary when feeding the machine to insert the dowel rods in the carriers 8 when the said carriers assume a position over the tables as at 70 so the rods will drop far enough only to receive the initial end pointing.

In operation the machine is connected from a power source by means of a belt, a suitable pulley to be mounted in the shaft 42, which is driven at a high rate of speed, this shaft transmitting power to the vertical saw shaft through the bevel gears 40 and 41. The turret 14 is rotated by the worm and worm gear inside the drum, the worm being driven by means of the shaft 11 from the pulleys 43 and 13, the shaft 11 being started or stopped by means of the idler pulley 44, which is brought up tight against the belt for starting the turret 14 which is thereby controlled independently of the main drive shaft 42. Dowel rods 46, are previously prepared by suitable machinery leaving them of a uniform size to fit loosely in the carriers 18, these rods may be of various lengths as made from scrap material. The rods are placed in the carriers by the operator as they revolve and as fast as one carrier empties a new rod is dropped in to maintain a complete supply to be acted upon. The rods drop down and rest on the tables 69 which predetermines the amount of the rod resting below the saw path, the rods traveling forward past and through the saw path are cut off and pointed, the short end cut off being waste. Immediately after passing the point of cutting and when released by the dog 58 the rod drops down on the segmental rail 24 which is adjusted relatively in height to give the desired length of dowel pin.

As the dowel rods are caused to pass through the saw path they are cut off and pointed simultaneously as shown in Fig. 3 wherein it is seen the saw teeth are positioned to cut slightly beyond the center of the rod. In order to cut and point the pins it is necessary to cause the dowel rod to revolve during its passage through the saw teeth which is accomplished by the toothed dogs 48 and 49, these dogs being under spring tension, grip the surface of the rods as they travel causing them to revolve practically a complete revolution while passing the saw teeth.

Immediately as the dowel rod completes the turn and is cut off, it passes the end of the lower dog 49 and passes over the end of the track 23 allowing the cut off portion to drop out of the carrier into a suitable trough or catcher 71, which delivers the finished pins ready for use. The upper dog 48 continues to hold the rod 46 in its same vertical position until engaged by the dog 58 which continues to hold it in place until it passes over the edge of the track 24, when it leaves the dog 58 and drops down on the track ready for another cut on the next cycle.

It will be seen by Fig. 6 that the dog 48 is given a curve where the teeth act on the dowel rod which is arranged at a radius from the center of the saw axis, the object being to give the rod the same depth of cut during its entire revolution. It is necessary that the carrier 18 travel through a circular path of a radius to correspond with the size of saw used and which is accomplished by the cam groove in the drum 4, being reversed in its curve at 8, radially from the saw axis. Fig. 6 shows the travel of the dowel pin 46 which, while being rotated by the teeth, take the circular path 68. The center saw 27 does the direct cutting off while the upper and lower saws 28 and 29 point the pins to the required angle, the teeth being formed to suit the type of point desired.

Any desired length of pin can be had by varying the height of the rails 23 and 24 which are adjustable by the brackets 26, and any diameter of pin can be handled by changing the carriers 18 to another set with the proper sized hole in which case the front side of the rod is always maintained at the same distance from the center of the machine so that dogs 48, 49, 58 and 61 will hold the same tension regardless of the size of the rods. To obtain the proper saw depth the bracket 32 is moved in or out by means of the adjusting wheel 35.

The office of the opening in the rails below the dog 61 is to allow the short ends to drop out into the pan or chute 71, the dog 61 fitting into the opening 20 withholds any piece of useful length while passing over the opening in the rails, until it again reaches the track and carried around for another cut.

It is important that the edge 25 be beveled so the dowel rods will be directed into position on the rail 24 when being dropped into the carriers from the top, the rods fitting rather loosely in the carriers and sometimes being warped or bent, the beveled edge will always protect any misplacement of same. The machine is therefore universal in its action being capable, by means of adjustment, of handling all sizes of dowel pins, throwing the perfect pins out of the chute 71 and the cull pins out of 72, and working up the rods as rapidly as fed in place by the operator.

Having fully described the invention what I claim and desire to secure by Letters-Patent is:—

1. In a dowel cutting off and pointing machine the combination with a supporting frame, a plurality of dowel rod carriers mounted to rotate bodily about the frame and having radial movement within their mounting, a driving shaft, a revoluble cutting off and pointing cutter mounted slidingly on the frame and driven by gears from the driving shaft and means for causing the carriers to divert into a path concentrically disposed about the cutter during the cutting operation.

2. In a dowel cutting off and pointing machine the combination with a supporting frame, a plurality of dowel rod carriers mounted to rotate bodily about the frame and having radial movement within the mounting, yielding devices attached to the frame and adapted to grip and rotate the contents of the carriers during a portion of the peripheral travel thereof, a driving shaft, a revoluble cutting off and pointing device mounted adjustably in the frame and driven through gears from the driving shaft and means for causing the carriers to divert into a path concentrically disposed about the axes of the cutting off device during its cutting action.

3. In a machine of the class described the combination with a base, a cylindrical frame mounted thereon, a revoluble disk mounted on the frame and having radial slots in its under face, dowel rod carriers extending from the slots and having a limited movement therein, a bracket adjustably mounted in the base, a cutter device comprising one or more circular saws rotatably mounted in the bracket and adapted to cut through the path of travel of the carriers, means for rotating the contents of the dowel carriers during the cutting action and means for causing the carriers to travel circumferentially about the cutter over a path concentric with the cutter axis during the cutting action thereof.

4. In a machine of the class described the combination with a base, a cylindrical frame mounted thereon, a revoluble disk mounted on the frame and having radial slots in its under face, a cam groove in the top of the cylindrical frame, bars fitted in the slots and having controlling means attached thereto and extending into the cam groove, dowel rod carriers attached to the bars, a cutting and pointing device adjustably mounted on the base and adapted to cut partially through the carriers, means for rotating the contents of the dowel rod carriers during the action of the cutting and pointing devices.

5. In a machine of the class described the combination with a base and cylindrical frame mounted thereon, a revoluble disk mounted on the frame and journaled therein, a plurality of dowel rod carriers connected with and extending from the disk, holes through the carriers, a rail disposed below the path of the carriers, and around the frame, means for adjusting the rail vertically, a revoluble cutting off and pointing device attached adjustably to the base and adapted to act within the path of the carriers, an opening in the rail adjacent to the cutting off and pointing device for the passing of the product of the carriers, a yielding device disposed above the opening for gripping the contents of the carriers; another opening in the rail spaced from the first said opening and means for retaining the rods in the carriers during their travel over said opening.

6. In a machine of the class described the combination with a base having a cylindrical frame mounted thereon, a plurality of dowel rod carriers mounted to rotate bodily about the frame, holes through the carriers, slots across the carriers opening into the said holes, an upright frame mounted on the base, a yielding dog loosely attached to the frame and resting in the path of one of the slots of the carriers, another yielding dog loosely attached to the frame below the first said dog and resting in the path of one of the slots of the carrier, teeth formed in the edge of the dogs, a cutter device adjustably journaled to the base and having its periphery positioned relatively to the carrier and between the two said dogs, a rail arranged below the holes of the carriers and adjustably attached to the frame, openings in the rail, an auxiliary yielding dog pivoted adjacent to the first said dog, another dog spaced from the first dog and adapted to rest in the path of the uppermost slot of the carrier, said dog being attached to the frame and means for rotating the carriers and cutter device.

7. In a machine of the class described the combination with a base having a cylindrical frame mounted thereon, vertically disposed dowel rod carriers adapted to revolve about the frame, a flanged rail comprising two sections arranged below the carriers and adjustably secured to the frame, yielding tables or supports disposed above the flanged rail, said tables being adapted to support the material being fed to the machine, a cutting off and pointing device revolubly mounted on the base and having its cutting portion arranged to act in the path of travel of the dowel rod carriers and its height arranged slightly above the yielding tables, means for adjusting the cutting off and pointing device and means for rotating the dowel rods during cutting action.

In testimony whereof I affix my signature, in the presence of two witnesses.

CHARLES G. DAUBER.

Witnesses:
ROBERT DAUBER,
FRANCIS V. MCMANAMY.

Copies of this patent may be obtained for five cents each, by addressing the "Commissioner of Patents, Washington, D. C."